United States Patent [19]

Streeter

[11] 4,109,392
[45] Aug. 29, 1978

[54] POCKET LEVEL

[75] Inventor: Walter E. Streeter, Coral Springs, Fla.

[73] Assignee: Mayes Brothers Tool Manufacturing Co., Johnson City, Tenn.

[21] Appl. No.: 835,484

[22] Filed: Sep. 22, 1977

Related U.S. Application Data

[63] Continuation of Ser. No. 713,187, Aug. 10, 1976, abandoned.

[51] Int. Cl.² .............................................. G01C 9/28
[52] U.S. Cl. ................................................... 33/381
[58] Field of Search .................................. 33/379–383

[56] References Cited

U.S. PATENT DOCUMENTS

| 1,159,522 | 11/1915 | Miller | 33/379 |
| 2,796,673 | 6/1957 | Wells | 33/382 |
| 2,948,067 | 8/1960 | Mistretta | 33/381 |

OTHER PUBLICATIONS

Bronson Sonic Power Co., Ultrasonic News, Jul. 1972.
Bronson Sonic Power Co., Ultrasonic News, Feb. 1973.

*Primary Examiner*—Charles E. Phillips
*Attorney, Agent, or Firm*—Charles L. Lovercheck

[57] ABSTRACT

A spirit level made of two identical halves is disclosed. The halves are each in the form of a web with marginal flanges and spaced openings. Each opening receives a level vial and a recess is provided in the web at each end of each opening receiving the ends of the level vials.

9 Claims, 5 Drawing Figures

U.S. Patent  Aug. 29, 1978  4,109,392
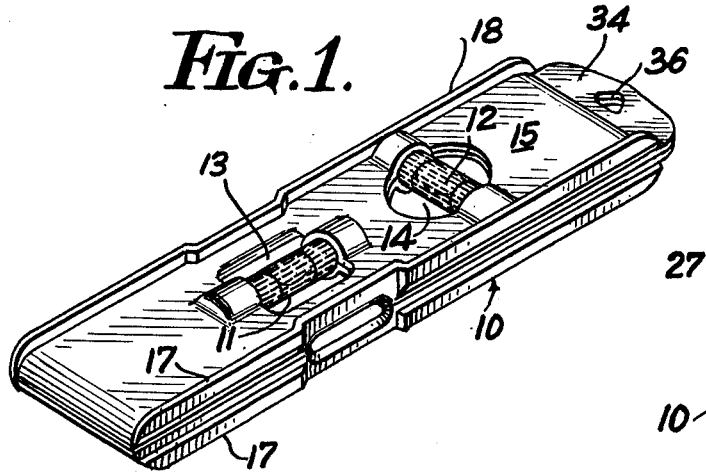
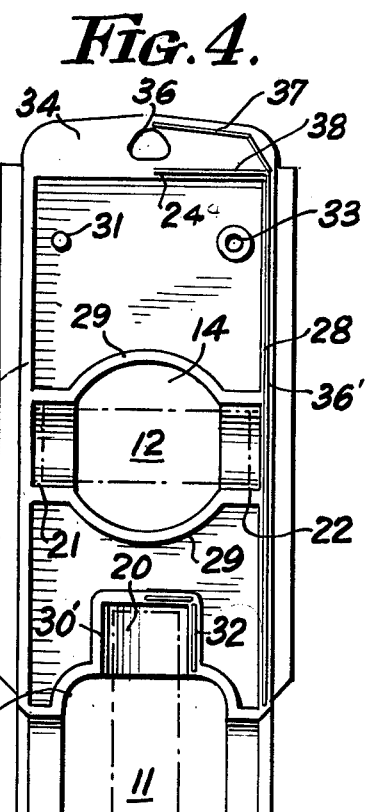
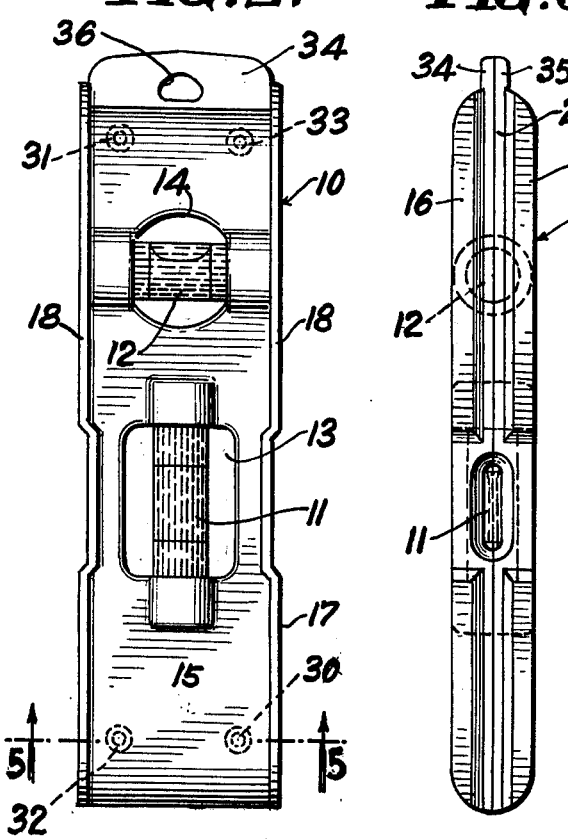
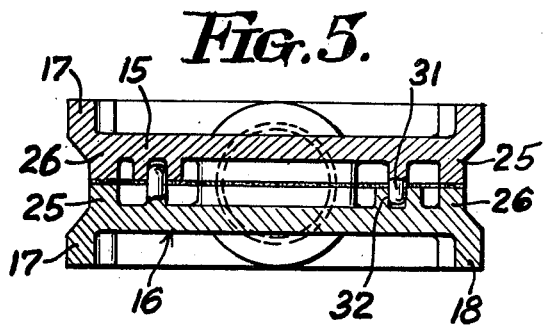

POCKET LEVEL

This is a continuation, of application Ser. No. 713,187 filed Aug. 10, 1976 now abandoned.

OBJECTS OF THE INVENTION

It is an object of the invention to provide an improved level.

Another object of the invention is to provide a level that is simple in construction, economical to manufacture and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

GENERAL DESCRIPTION OF THE DRAWINGS

FIG. 1 is an isometric view of a level according to the invention.

FIG. 2 is a side view of the level shown in FIG. 1.

FIG. 3 is a top view of the level shown in FIG. 1.

FIG. 4 is a side view of one half of the level taken from the side adjacent the other said half.

FIG. 5 is a cross-sectional view taken on Line 5—5 of FIG. 2.

DETAILED DESCRIPTION OF THE DRAWINGS

Now, with more particular reference to the drawings, spirit level 10 is made up of a body having two level vials 11 and 12 extending across openings 13 and 14 supported on it. The body is thermoplastic material of substantially uniform thickness throughout. Each half has a plate-like webs 15 and 16 extending from one end thereof to the other. Each web 15 and 16 has generally parallel outwardly-extending flanges 17 and 18 on it and each web has a recess 19, 20, 21 and 22 diametrically disposed on each side of said openings, said recess being generally in the shape of part of a cylinder. Each half has a rib extending along the sides, and ribs 29 and 30' extending around recess 19, 20, 21 and 22. The ribs of one said half are adapted to rest against the ribs on the other half when the level is assembled. Spaced pintles 30 and 31 fixed to each said web and extending toward the other web and hollow bosses 32 and 33 fixed to each said web extending toward the other said web. The pintles 30 and 31 on one web are received in said recessed bosses 32 and 33 on the other said web for holding said level in assembled position.

The tabs 34 extend beyond the ends of the webs. Tabs 34 rest on each other and have openings 36 formed in them. Opening 36 may receive a hanger for supporting the level in a tool holder. Ribs 24, 26 and 28 along one side of webs 15 and 16 have energy directors 33', 34', 36', and 38 familiar to those skilled in the art which engage the web on the other half for ultrasonic welding.

The recess 19 and 20 are defined by half cylinder shaped walls which receive the ends of the level vials. Likewise, recesses 21 and 22 are formed of half cylinder shaped walls integral with webs 15 and 16 which receive level vials 12.

The two halves of the level disclosed herein are identical as shown which simplifies the process of manufacturing the level.

To assemble the level the vials 11 and 12 are placed in their respective cavities 19 and 20 and 21 and 22 in one half of the level body. The other half of the level body is then put in place with the pintles 30 and 31 entering the openings in the bosses 32 and 33 on the other half and with the energy director 33, 34', 35', 37, and 38 engaging flange 27, on the other half. The level is then subject to ultrasonic energy which ultrasonically welds the two halves together.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A spirit level comprising,
   a body and two level vials supported on said body and disposed at right angles to each other,
   said body being made up of two substantially identical separate halves, each said half comprising,
   a relatively thin planar web,
   each said web being disposed in a plane parallel to the other and having a first opening and a second opening spaced axially from each other with the openings of one web being aligned with the openings of the other web,
   each said web having a first recess on a first side of a each opening and a second recess on the second side of each opening diametrically opposite said first recess, said recesses adapted to receive the ends of said level vial for positioning the vial at a predetermined position relative to the body,
   said recesses being formed by said web material being curved outwardly to form a cavity in the form of a half cylinder adapted to conform to the outside surface of an end of said level vials,
   means for holding said webs together with said level vials therebetween with the ends of said vials disposed in said recesses,
   each vial extending across a said opening from one side thereof to the other,
   each said web having an inwardly directed rib extending toward the corresponding rib on the other,
   said ribs extending around the outer edges of said recesses and around said openings defining marginal edges for said openings and said recesses and around at least a part of the periphery of said webs and holding said webs in spaced relation to each other,
   said ribs on each said half resting on the ribs on the other said half providing a spacing between said webs,
   energy directors on said ribs for facilitating ultrasonic welding of said ribs together.

2. The level recited in claim 1 wherein said webs have two side edges parallel to each other and parallel to one said vial and perpendicular to the other said vial,
   and outwardly directed flanges on each said web adjacent to each of said two side edges of said webs and extending outward in a direction opposite the direction of said ribs.

3. The level recited in claim 2 wherein the ends of said flanges are curved inward toward said web in a semi-circular arc.

4. The level recited in claim 2 wherein a recess is formed in said ribs which are adjacent said vial,
    said recess providing an opening to view said vial from a direction perpendicular to said side edges.

5. The level recited in claim 4 wherein a part of said webs are held in spaced relation to each other by said ribs.

6. The level recited in claim 4 wherein a second part of said web curve inwardly toward each other at one end thereof into engagement with each other and a third part of said webs extend parallel to each other in engagement with each other,
    and a hole is formed in said third part of said web for receiving a hanger.

7. The level recited in claim 2 wherein said ribs extend continuously across an end of said level along the sides to a position adjacent one said opening then along one end of said one opening along the edges of one said recess to the other said web.

8. The level recited in claim 7 wherein said ribs extend across said web at a second end then along said side edges forming an end for said second recess and along said second side of said first mentioned recess.

9. The level recited in claim 1 wherein said means holding said webs together comprises,
    pintles integrally formed on said webs on the side therefor adjacent the other said web and recessed bosses opposite each said pintle on the other said web for receiving said pintles for holding said level halves together.

* * * * *